US010562409B2

(12) United States Patent
Kadiu et al.

(10) Patent No.: US 10,562,409 B2
(45) Date of Patent: Feb. 18, 2020

(54) MOUNTING HARDWARE FOR VEHICLE STRUCTURES

(71) Applicant: Ford Global Technologies, LLC, Dearborn, MI (US)

(72) Inventors: Arnold Kadiu, Dearborn, MI (US); Ari Caliskan, Canton, MI (US); Aref Vandadi, Livonia, MI (US); Parameswararao Pothuraju, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 77 days.

(21) Appl. No.: 16/028,054

(22) Filed: Jul. 5, 2018

(65) Prior Publication Data

US 2020/0009992 A1 Jan. 9, 2020

(51) Int. Cl.
*B60N 2/015* (2006.01)
*B60N 2/07* (2006.01)
*B62D 65/14* (2006.01)
*B62D 25/20* (2006.01)

(52) U.S. Cl.
CPC ........... *B60N 2/015* (2013.01); *B60N 2/0715* (2013.01); *B60N 2/0732* (2013.01); *B62D 25/2009* (2013.01); *B62D 65/14* (2013.01)

(58) Field of Classification Search
CPC .... B60N 2/015; B60N 2/0715; B60N 2/0732; B62D 25/2009; B62D 65/14
See application file for complete search history.

(56) References Cited

U.S. PATENT DOCUMENTS

| 5,104,176 | A | 4/1992 | Mrozowski |
| 5,915,778 | A | 6/1999 | Winkelhake et al. |
| 5,941,600 | A | 8/1999 | Mar et al. |
| 6,264,158 | B1 | 7/2001 | Downey et al. |
| 6,519,792 | B2 * | 2/2003 | Chen ........................ B62B 9/22 5/107 |
| 7,393,167 | B2 | 7/2008 | Dowty et al. |
| 7,566,086 | B2 | 7/2009 | Gray et al. |
| 7,780,138 | B1 * | 8/2010 | Lee ...................... B60N 2/0705 248/429 |
| 9,783,079 | B2 | 10/2017 | Cardone et al. |
| 10,155,548 | B2 * | 12/2018 | Baccouche ............ B60J 5/0479 |
| 2004/0118990 | A1 * | 6/2004 | Yokoi .................. B60N 2/0705 248/424 |
| 2004/0124683 | A1 * | 7/2004 | Matsumoto .......... B60N 2/0705 297/344.1 |
| 2005/0242604 | A1 * | 11/2005 | Bonnes ................ B60N 2/0818 296/35.1 |

(Continued)

FOREIGN PATENT DOCUMENTS

DE 102006027426 A1 * 12/2006 ............. B60N 2/015

*Primary Examiner* — Lori L Lyjak
(74) *Attorney, Agent, or Firm* — Vichit Chea; Price Heneveld LLP

(57) ABSTRACT

A mounting rail assembly for mounting a seat to a vehicle is provided. The mounting rail assembly includes a substrate positioned between a first U-shaped track and a second U-shaped track in addition to one or more attachment members configured to couple the first and second U-shaped tracks and provide a clamping pressure to the substrate. The first and second U-shaped tracks include a plurality of apertures to receive the one or more attachment members.

17 Claims, 7 Drawing Sheets

(56) References Cited

U.S. PATENT DOCUMENTS

| | | | |
|---|---|---|---|
| 2007/0057080 A1* | 3/2007 | Ngai | A63H 17/14 |
| | | | 238/10 F |
| 2014/0354023 A1* | 12/2014 | Yamada | B60N 2/0732 |
| | | | 297/344.1 |
| 2015/0030806 A1* | 1/2015 | Fink | B32B 3/12 |
| | | | 428/116 |
| 2015/0090853 A1* | 4/2015 | Arakawa | B60N 2/0705 |
| | | | 248/429 |
| 2016/0347205 A1* | 12/2016 | Cardone | B60N 2/015 |
| 2017/0341532 A1* | 11/2017 | Sowinski | B60N 2/0732 |
| 2018/0118056 A1* | 5/2018 | Wolgast | B60N 2/01516 |
| 2018/0326872 A1* | 11/2018 | Osterhoff | B60N 2/682 |
| 2019/0118954 A1* | 4/2019 | Movsesian | B64D 11/0696 |

\* cited by examiner

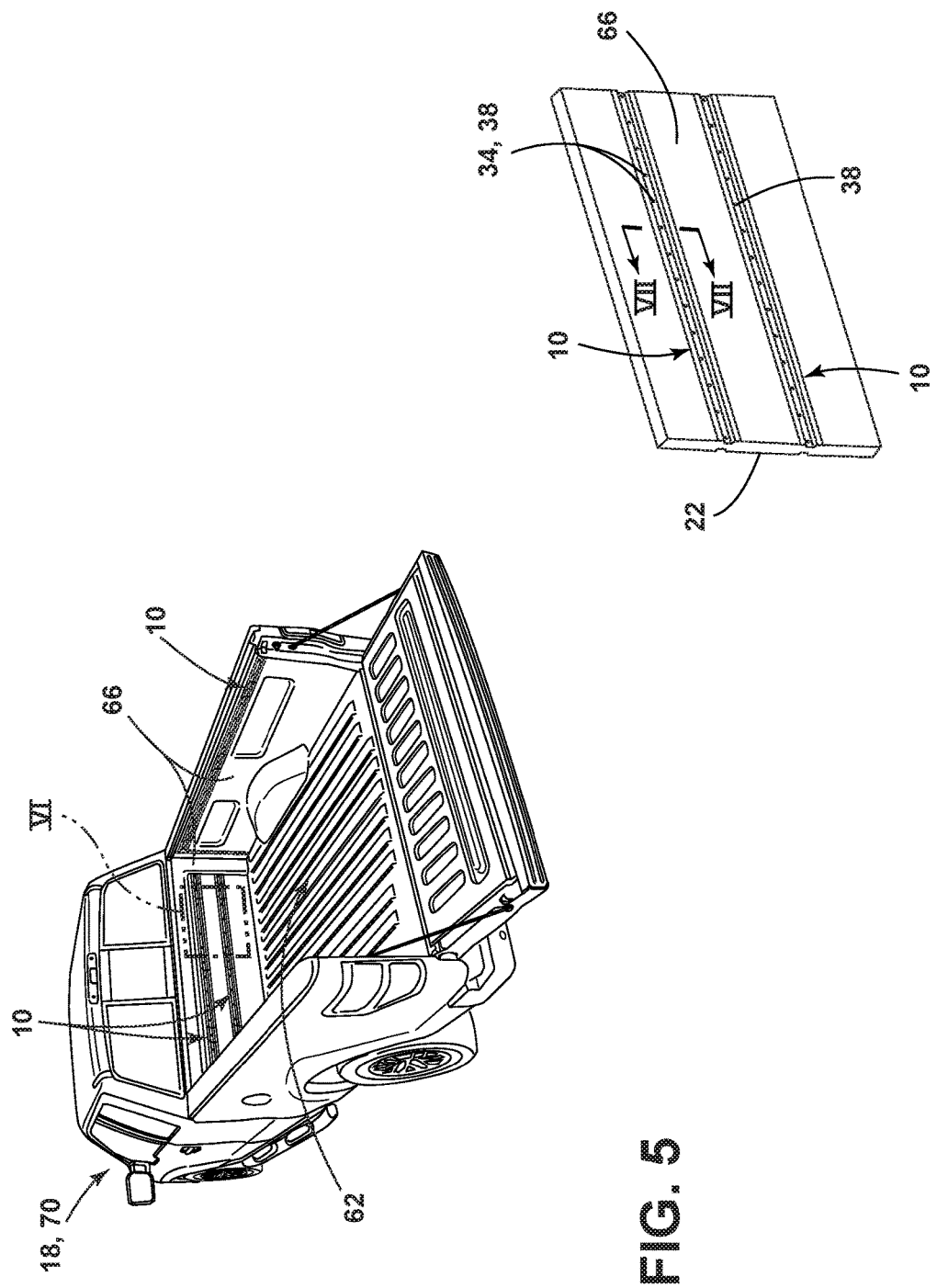

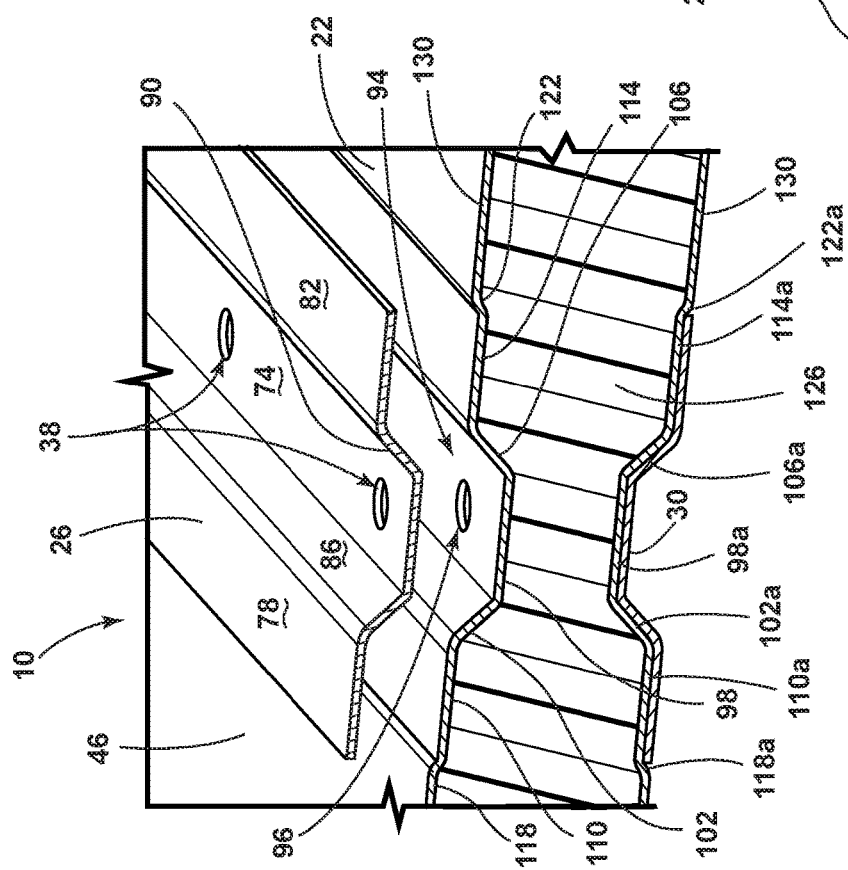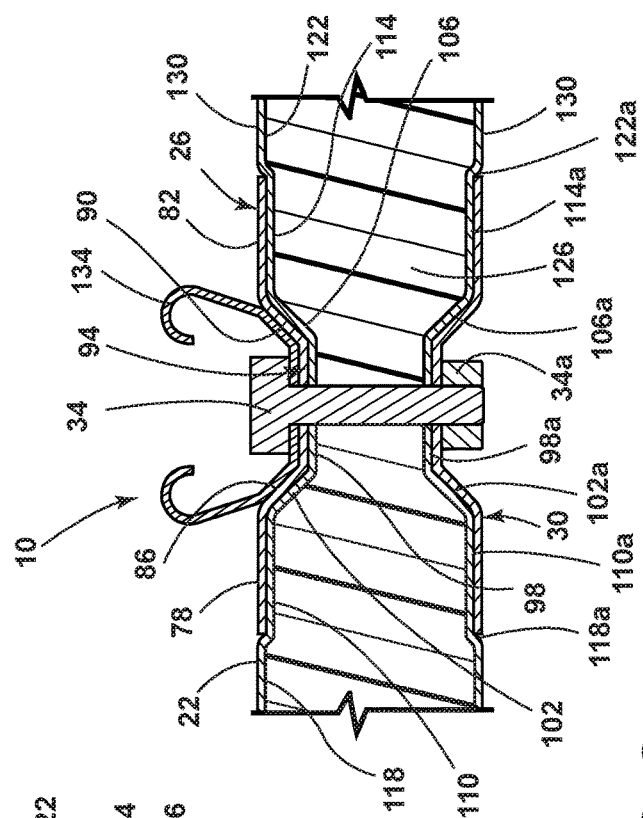

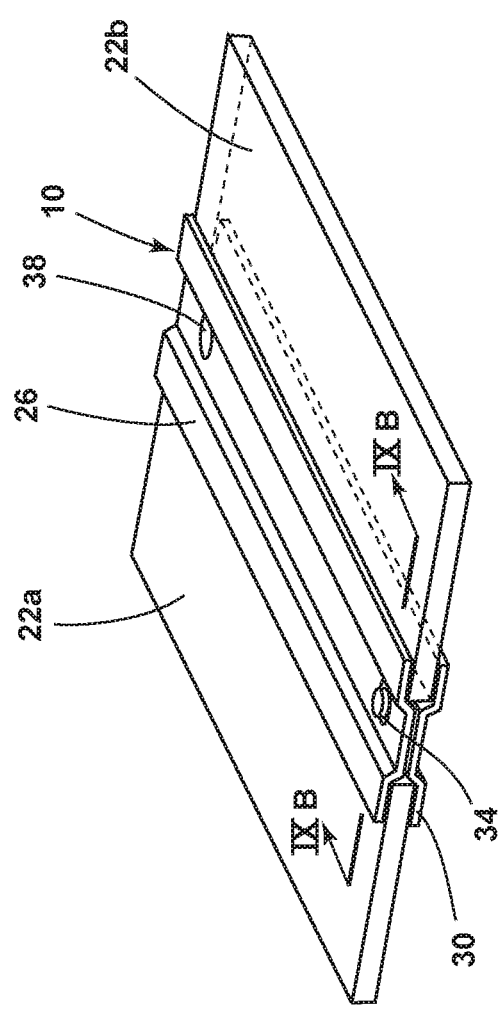
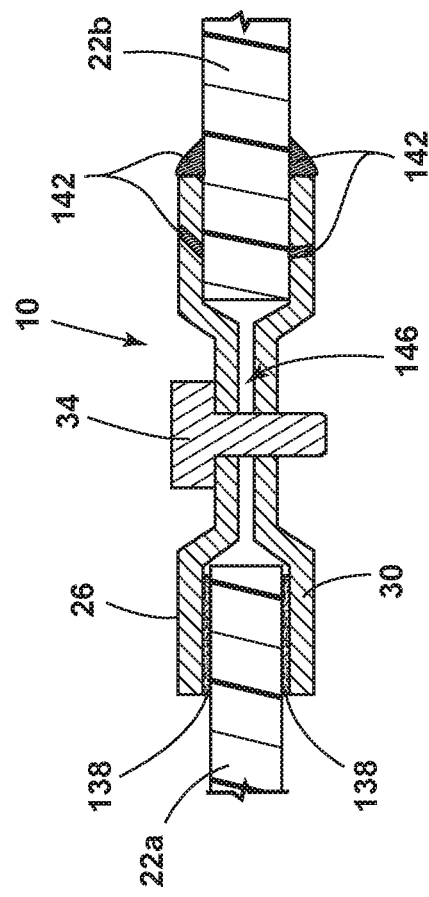
FIG. 9A
FIG. 9B

MOUNTING HARDWARE FOR VEHICLE STRUCTURES

FIELD OF THE INVENTION

The present invention generally relates to a mounting rail assembly, and more specifically, to a mounting rail assembly for mounting a seat or other structure to a vehicle.

BACKGROUND OF THE INVENTION

Vehicles typically use various types of seat tracks or other mounting assemblies that are attached to a vehicle body using bolts.

The passenger compartments found in many currently available vehicles include vehicle seats in a variety of different arrangements and/or numbers depending on the requirements and/or final design of the finished motor vehicle. The bolt locations and corresponding mounting assemblies in these vehicles are typically designed in line with the vehicle body structure, limiting the flexibility as to where the seats may be positioned, making changes expensive and time consuming.

Accordingly, there is a need for improved options and features for mounting rails used in a vehicle.

SUMMARY OF THE INVENTION

According to one aspect of the present invention, a mounting rail assembly for mounting a seat to a vehicle is provided. The mounting rail assembly includes a substrate between a first U-shaped track and a second U-shaped track in addition to one or more attachment members configured to couple the first and second U-shaped tracks and provide a clamping pressure to the substrate. The first and second U-shaped tracks include a plurality of apertures to receive the one or more attachment members.

Embodiments of the first aspect of the invention can include any one or a combination of the following features:
first and second U-shaped tracks each comprise a center portion having flanges disposed outwardly from angled walls;
one or more adjustable seat attachment members;
the substrate is a floor panel;
the substrate comprises a lightweight core material enclosed with an outer cover;
the substrate is a honeycomb panel, a composite panel, a metal panel, a polymeric panel, or a combination thereof;
an adhesive and/or a metal weld coupled to the substrate and the first and second U-shaped tracks;
the substrate includes at least one U-shaped substrate channel having a second plurality of apertures that align with the plurality of apertures in the first and second U-shaped tracks;
the substrate comprises two or more floor panels that are coupled together using the clamping pressure provided using the one or more attachment members;
the substrate is a floor panel and wherein the first and second U-shaped tracks are each positioned in a U-shaped substrate channel.

According to another aspect of the present invention, a mounting rail assembly is provided. The mounting rail assembly includes a first U-shaped track and a second U-shaped track comprising a center portion having flanges disposed outwardly from angled walls; one or more substrates positioned between the first and second U-shaped tracks; and one or more attachment members configured to couple the first and second U-shaped tracks by providing a clamping pressure to the one or more substrates.

Embodiments of the second aspect of the invention can include any one or a combination of the following features:
the mounting rail assembly is positioned on a vehicle floor, a truck bed, a vehicle sidewall, a truck bed sidewall, or a combination thereof;
an adhesive and/or a metal weld coupled to the one or more substrates and the first and second U-shaped tracks;
the substrate comprises two or more floor panels that are coupled together using the clamping pressure provided using the one or more attachment members.

According to yet another aspect of the present disclosure, a method for mounting a seat in a vehicle in provided. The method includes attaching one or more seats to at least one mounting rail assembly, the mounting rail assembly comprising: a first U-shaped track and a second U-shaped track; one or more substrates positioned between the first and second U-shaped tracks; and one or more attachment members configured to couple the first and second U-shaped tracks by providing a clamping pressure to the one or more substrates.

Embodiments of the third aspect of the invention can include any one or a combination of the following features:
the seat is attached to two mounting rail assemblies;
detaching the one or more seats; and reattaching the one or more seats to a different position on the at least one mounting rail assembly;
the substrate comprises two or more floor panels that are coupled together using the clamping pressure provided using the one or more attachment members;
the substrate is a floor panel and wherein the first and second U-shaped tracks are each positioned in a U-shaped substrate channel.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 5 is a rear perspective view of a truck bed having a mounting rail assembly attached to the truck bed walls, according to some aspects of the present disclosure;

FIG. 6 is a front perspective view of the mounting rail assembly attached to the truck bed wall taken along portion VI of FIG. 5;

FIG. 7 is a partially exploded cross-sectional view of the mounting rail assembly provided in FIGS. 4 and 6 taken along the line VII-VII, according to some aspects of the present disclosure;

FIG. 8 is a cross-sectional view of a mounting rail assembly including a seat attachment member, according to some aspects of the present disclosure;

FIG. 9A is a cross-sectional view of a mounting rail assembly including two substrates, according to some aspects of the present disclosure;

FIG. 9B is a cross-sectional view of a mounting rail assembly having two substrates provided in FIG. 9A taken along the line IXB-IXB of FIG. 9A, including an addition adhesive and a weld applied, according to some aspects of the present disclosure.

DETAILED DESCRIPTION OF THE PREFERRED EMBODIMENTS

Figure 1:
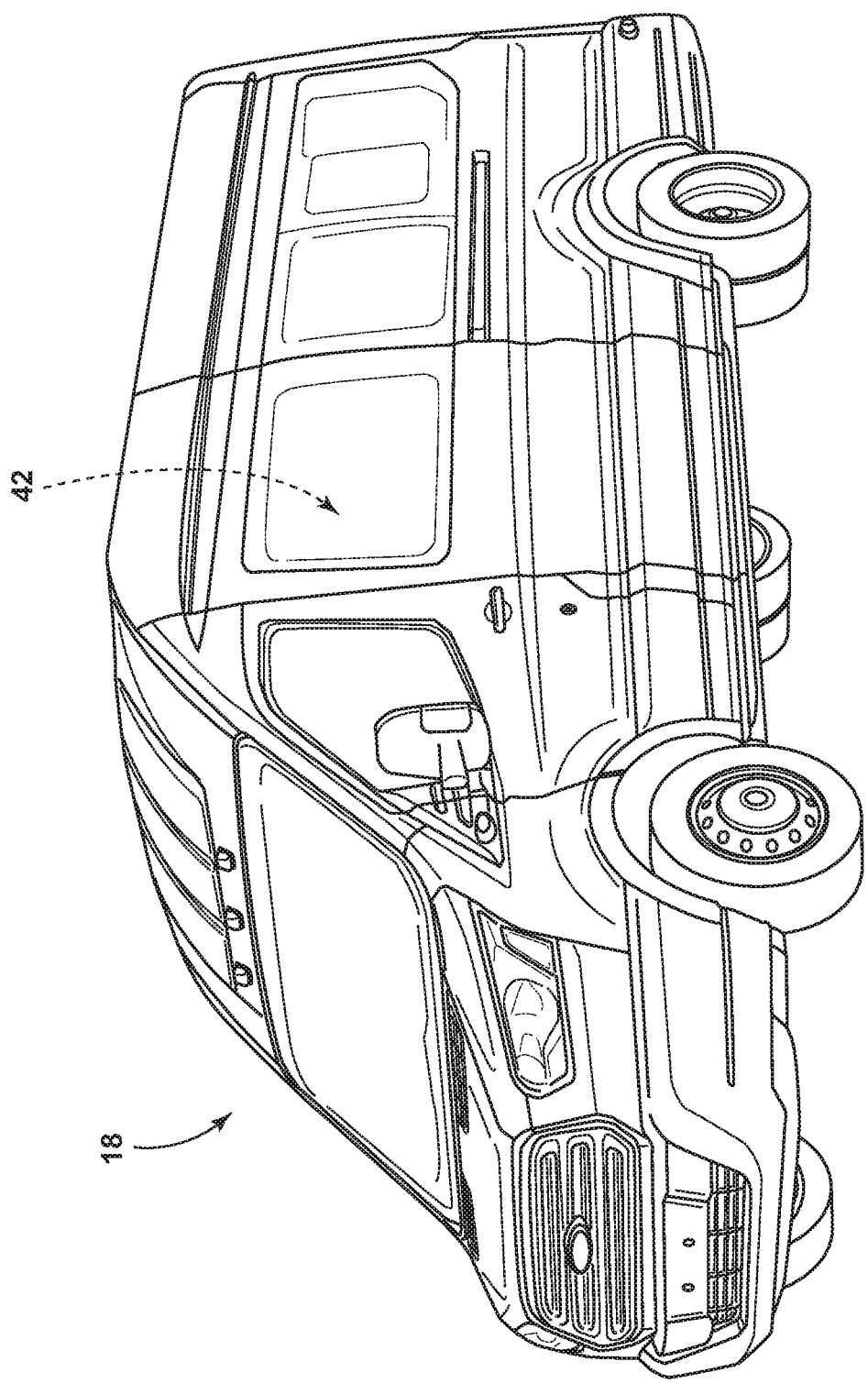
FIG. 1 is a front perspective view of a vehicle.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-9B, reference numeral 10 generally designates a mounting rail assembly for mounting a seat 14 to a vehicle 18. The mounting rail assembly 10 includes a substrate 22 positioned between a first U-shaped track 26 and a second U-shaped track 30 in addition to one or more attachment members 34 configured to couple the first and second U-shaped tracks 26, 30 and provide a clamping pressure to the substrate 22. The first and second U-shaped tracks 26, 30 include a plurality of apertures 38 to receive the one or more attachment members 34.

Referring to FIG. 1, the wheeled automotive vehicle 18 is provided having a passenger compartment 42. The vehicle 18 is shown as a van although the type of vehicle 18 is not meant to be limiting and the vehicle 18 could additionally be, for example, a car, truck, commercial vehicle, or any other wheeled motorized vehicle.

Figure 2:
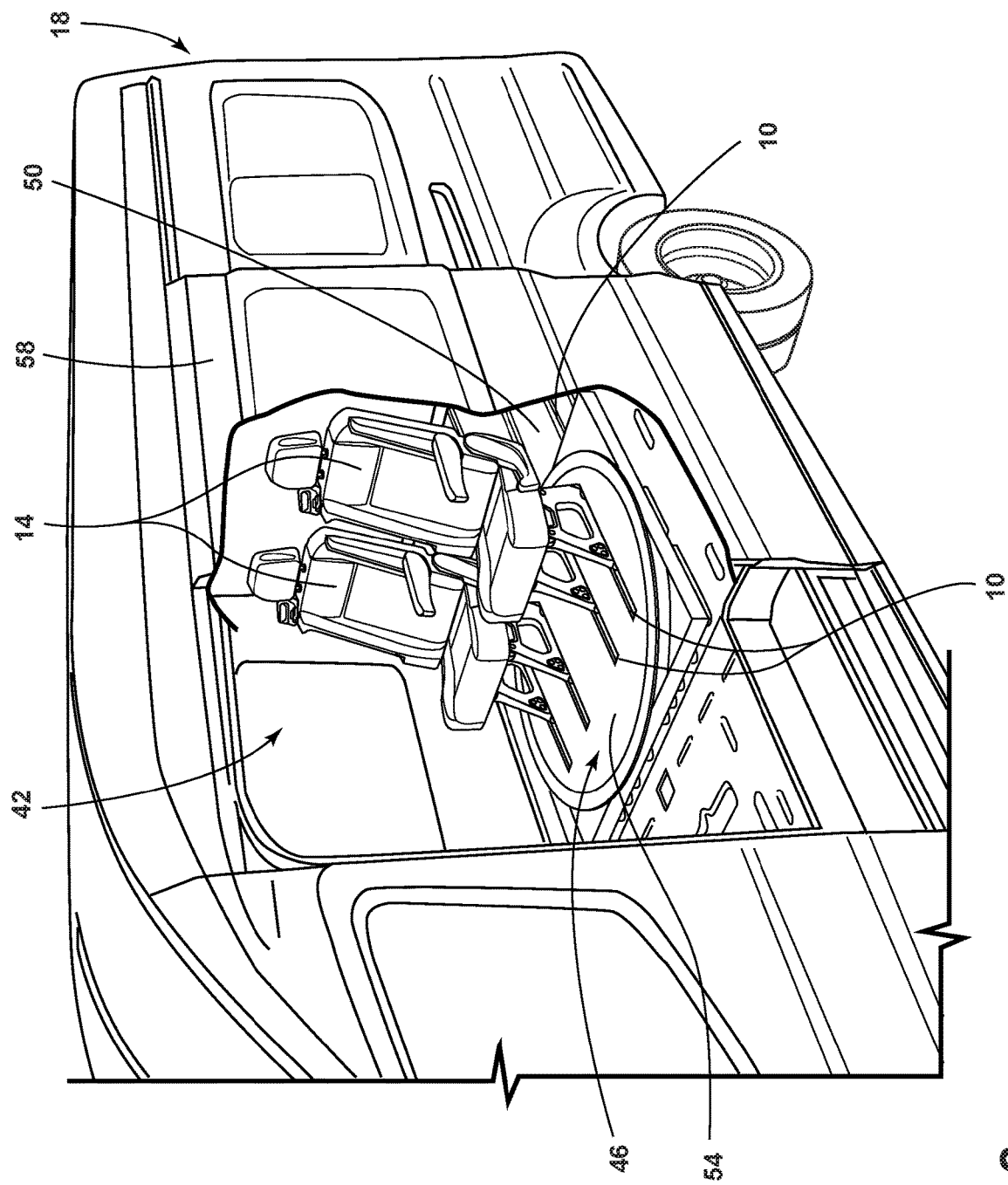
FIG. 2 is a partial cross-sectional perspective view of the vehicle presented in FIG. 1 according to some aspects of the present disclosure.

Referring now to FIG. 2, a partial cross-section perspective view of the vehicle 18 presented in FIG. 1 is provided. The vehicle 18 includes the passenger compartment 42 having one or more seats 14 coupled to the mounting rail assembly 10. In some aspects, the passenger compartment 42 includes a vehicle floor/surface 46 that may include a static floor seating surface 50 and/or a rotating seat module 54. The rotating seat module 54, as illustrated, may rotate clockwise or counterclockwise towards one or more doors 58 to better maneuver passengers in and out of the vehicle 18. The rotating seat module 54 and/or the static floor seating 50 may be coupled to the mounting rail assembly 10 including the substrate 22 that can provide the vehicle floor 46 (e.g. the floor surface).

The use of the mounting rail assembly 10 in the rotating seat module 54 and/or the static floor seating 50 may provide many advantages. For example, the use of substrates 22 having less weight can decrease the energy required to rotate and/or move the rotating seat module 54 from a seating position where the seats 14 are facing frontwards in the vehicle 18 to an alternate position where the seats 14 are facing outwards towards the door 58, or facing rearwards in the vehicle 18. The substitution of lightweight polymeric materials, ceramic materials, metal alloy materials in combinations with alternative material architectures (e.g. honeycomb hexagonal lattice structures) would allow for static floor seating surfaces 50 and/or a rotating seat modules 54 having a lighter weight relative to heavier stamped steel or metal materials. The use of lighter weight materials in the vehicle 18 can translate to improved fuel efficiency, better handling, and faster acceleration times.

Figure 3:
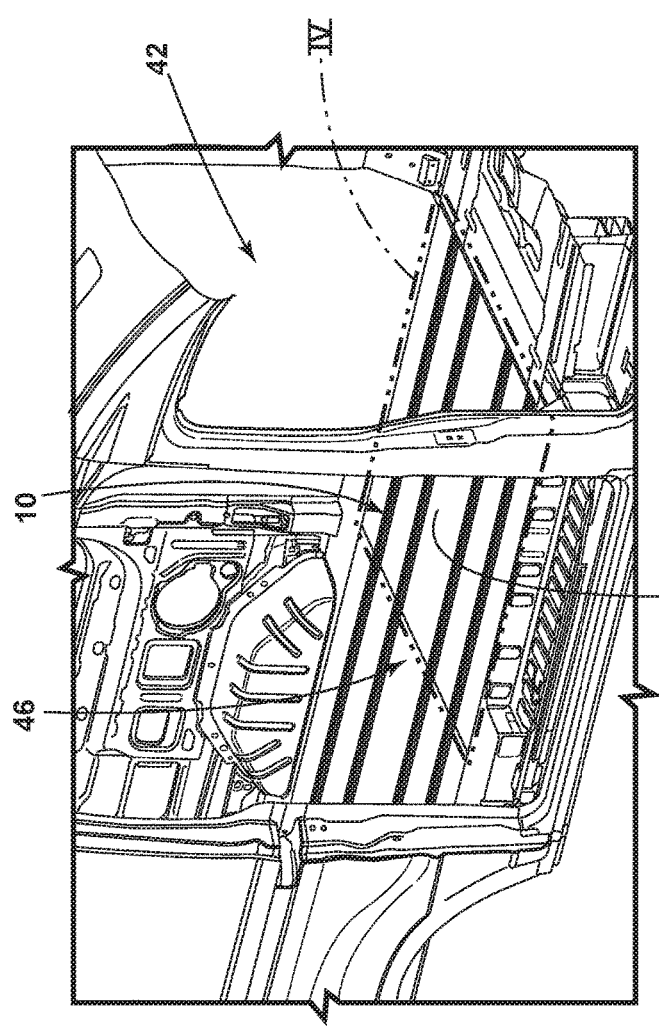
FIG. 3 is a perspective view of a vehicle passenger compartment having a mounting rail assembly attached to a floor panel, according to some aspects of the present disclosure.

Referring now to FIG. 3, a perspective view of the passenger compartment 42 having the mounting rail assembly 10 operably coupled to the vehicle floor 46 is illustrating. In some aspects, the vehicle floor 46 of the passenger compartment 42 may include the rotating seat module 54. In some aspects, the vehicle floor 46 of the passenger compartment 42 may include the static floor seating surface 50. In still other aspects, the vehicle floor 46 of the passenger compartment 42 may include the static floor seating surface 50 and the rotating seat module 54. In some aspects, the floor panel 46 may include one or more mounting rail assemblies 10. In other aspects, the floor panel 46 may include one mounting rail assembly 10, two mounting rail assemblies 10, three mounting rail assemblies 10, four mounting rail assemblies 10, five mounting rail assemblies 10, six mounting rail assemblies 10, etc. The number and positioning of the mounting rail assemblies 10 used on the vehicle 18 may be at least partially determined by, for example, the types of seats 14, the seat's 14 attachment features, the number of seats 14, and/or the design of the vehicle 18.

Figure 4:
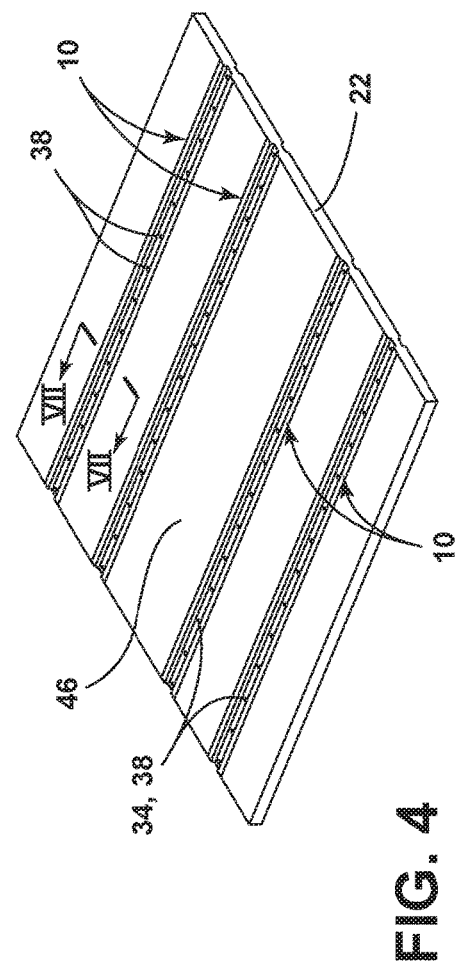
FIG. 4 is a front perspective view of the mounting rail assembly attached to the floor panel taken along portion IV of FIG. 3.

Referring now to FIG. 4, a front perspective view of the mounting rail assembly 10 operatively coupled to the vehicle floor 46 taken along portion IV of FIG. 3 is illustrated. The vehicle floor 46 is illustrated having four mounting rail assemblies 10 where each mounting rail assembly 10 includes the plurality of attachment members and apertures 34, 38 coupled to the substrate 22. In some aspects, the substrate 22 is a floor panel making up the vehicle floor 46. In other aspects, the substrate 22 includes a lightweight core material 126 (see FIG. 7) enclosed within an outer cover 130 (see FIG. 7). In still other aspects, the substrate 22 may include, for example, a honeycomb panel, a honeycomb panel having an outer cover, a composite panel, a metal panel, a polymeric panel, or a combination thereof. In some aspects, the honeycomb panels are weight efficient and may be used as the substrate 22 making up the vehicle floor 46, However, although the honeycomb panels may be structurally weak with regards to point loading, these honeycomb panels may distribute the load evenly across the honeycomb structure to dissipate applied loads. In some aspects, the reduced weight and reduced space taken up by the various lightweight substrates (e.g., honeycomb panels, honeycomb panels having an outer cover, composite panels, polymeric panels, or a combination thereof) can provide more space for the seats 14, passenger storage, and/or seating accessories.

In some aspects, the use of a lightweight honeycomb panel as the substrate 22 may provide several improved material properties in addition to weight. For example, if the thickness of a traditional bilayer flooring panel was T, the corresponding stiffness, flexural strength, and weight can all be defined as one (1). In some aspects, adding a honeycomb panel having a thickness of T that is positioned or sandwiched between the same two layers used in the traditional bilayer flooring panel, also having a thickness of T, the overall 2T thickness of the sandwiched honeycomb panel would provide a stiffness of 7.0, a flexural strength of 3.5, and a weight of 1.03 relative to the traditional bilayer flooring panel. In other aspects, sandwiching a honeycomb panel with a thickness of 2T between the traditional bilayer flooring panel also having a total thickness of T, the overall 3T thickness of the sandwiched honeycomb panel would provide a stiffness of 37.0, a flexural strength of 9.2, and a weight of 1.06 relative to the traditional bilayer flooring panel.

Referring now to FIG. 5, a rear perspective view of a truck bed 62 having one or more mounting rail assemblies 10 attached to at least one truck bed sidewall 66 is provided. In some aspects, the vehicle 18 may be a truck 70 where it may be desirable to attach seating, travel straps, securing devices, and/or various types of covers to the passenger compartment 42 or one or more truck bed walls 66. As provided in FIG. 5, in some aspects, the mounting rail assembly 10 may be operatively coupled to the truck bed 62 and/or one or more truck bed walls 66. In aspects where the mounting rail assembly 10 is not coupled to the substrate 22 of the vehicle floor 46, the substrate 22 may be modified, designed, coupled, and/or configured to be part of any surface in the vehicle 18. In some aspects, the mounting rail assembly 10 may be positioned on the vehicle floor 46, the truck bed 62, a vehicle sidewall, the truck bed sidewall 66, or a combination thereof. In some aspects, the mounting rail assembly 10 may include just one set of opposing first and second U-shaped tracks 26, 30 coupled to the substrate 22 using the plurality of attachment members 34 and apertures 38 to couple the seating 14, windows, reinforcement members, travel straps, securing devices, and/or various types of covers to, for example, the passenger compartment 42, truck bed 62, and/or one or more truck bed walls 66.

Referring now to FIG. 6, a front perspective view of the mounting rail assembly 10 attached to the truck bed walls 66 taken along portion VI of FIG. 5 is provided. The mounting rail assembly 10 includes the plurality of attachment members 34 positioned in the plurality of apertures 38. The surface of the truck bed wall 66 includes the substrate 22. The number and positioning of the mounting rail assemblies 10 coupled to the truck bed 62 or the one or more truck bed sidewalls 66 may be varied depending on the final design and/or applications for the vehicle 18.

Referring now to FIG. 7, a partially exploded cross-sectional view of the mounting rail assembly 10 provided in FIGS. 4 and 6 taken along the line VII-VII is provided. The mounting rail assembly 10 includes the substrate 22 positioned between the first and second U-shaped tracks 26, 30. The one or more attachment members 34 (see FIG. 8) are configured to couple the first and second U-shaped tracks 26, 30 and provide a clamping pressure to the substrate 22. The first and second U-shaped tracks 26, 30 include the plurality of apertures 38 to receive the one or more attachment members 34. The first and second U-shaped tracks 26, 30 include a center portion 74 coupled to a first flange 78 and a second flange 82 projecting outwardly from a first angled wall 86 and a second angled wall 90, respectively. Depending on the orientation of the mounting rail assembly 10 in the vehicle 18, in some aspects, the flanges 78, 82 may be disposed upwardly and outwardly from the angled walls 86, 90 with respect to the center portion 74. In some aspects, the first and second U-shaped tracks 26, 30 are each positioned in at least one U-shaped substrate channel 94 located on opposite but mirror image sides of the substrate 22. In some aspects, the U-shaped substrate channel 94 may include a center channel portion 98 coupled to a first channel angled wall 102 and a second channel angled wall 106 where the angled channel walls 102, 106 are each coupled to a first channel track wall 110 and a second channel track wall 114, respectively. In some aspects, the first and second channel track walls 110, 114 may each be coupled to a third channel angled wall 118 and a fourth channeled angled wall 122, respectively. The third and fourth angled channel walls 118, 122 each are coupled to the remaining vehicle floor 46 or outer cover 130. In some aspects, the substrate 22 may include a light-weight core material 126 having the outer cover 130 enclosing the lightweight core material 126. In some aspects, the outer cover 130 may include a thermoplastic, a thermoset, a metal, and/or a metal alloy including, for example, polyethylene, polyurethane, ABS, polypropylene, polystyrene, rubber, and polystyrenes.

In some aspects, the first and second U-shaped tracks 26, 30 are mirror images of each other positioned in first and second U-shaped substrate channels (only the first U-shaped substrate channel 94 is provided) located on opposite sides of the substrate 22. In some aspects, the first and second U-shaped substrate channels 94 are mirror images of each other while the second U-shaped substrate channel may include a center channel portion 98*a* coupled to a first channel angled wall 102*a* and a second channel angled wall 106*a* where the angled channel walls 102*a*, 106*a* are each coupled to a first channel track wall 110*a* and a second channel track wall 114*a*, respectively. In some aspects, the first and second channel track walls 110*a*, 114*a* may each be coupled to a third channel angled wall 118*a* and a fourth channeled angled wall 122*a*, respectively. The third and fourth angled channel walls 118*a*, 122*a* each are coupled to the remaining floor panel 46 or outer cover 130. In some aspects, the substrate 22 may include at least one U-shaped substrate channel 94 having a second plurality of apertures 96 that align with the plurality of apertures 38 positioned in the first and second U-shaped tracks 26, 30. The design of the mounting rail assembly 10 having the first and second U-shaped tracks 26, 30 positioned across from and coupled to each other through the substrate 22 provide for a more distributed crash or force loading while using lighter weight materials for the substrate 22. In some aspects, the substrate 22 is the vehicle floor 46 where the first and second U-shaped tracks 26, 30 are each positioned in different U-shaped substrate channels 94.

Referring now to FIG. 8, a cross-sectional view of the mounting rail assembly 10 including a seat attachment member 134 is provided. In some aspects, the mounting rail assembly 10 may include the seat attachment member 134 coupled to the first U-shaped track 126. In some aspects, the attachment member 34 may be positioned and/or configured to couple the seat attachment member 134 to the first U-shaped track 26 where the attachment member 34 may be held in place and maintain the clamping and/or pinching pressure to the seat attachment member 134 and first U-shaped track 26 using the attachment member 34*a*. In some aspects, the seat attachment member 134 may be configured to be reversibly and quickly coupled to one or more seats 14 to be installed in the vehicle 18. The design and structural features of the seat attachment member 134 are not meant to be limiting and may be configured to include any type of attachment member that may be used to reversibly or irreversibly couple seating, windows, reinforcement members, travel straps, securing devices, and/or various types of covers to the vehicle floor 46, passenger compartment 42, truck bed 62, and/or one or more truck bed walls 66. In some aspects, the seat attachment member 134 may include one or more adjustable seat attachment members. The features of the mounting rail assemblies 10 labeled and provided in FIG. 7 may be additionally applied to the mounting rail assemblies 10 illustrated in FIG. 8. In some aspects, the one or more seat attachment members 134 may be detached from the mounting rail assembly 10 and reattached to the mounting rail assembly 10 at a different position as defined by the placement of the plurality of apertures 38 positioned in the first and second U-shaped tracks 26, 30.

Referring now to FIG. 9A, a cross-sectional view of the mounting rail assembly 10 coupled to two substrates 22 is provided. In some aspects, the mounting rail assembly 10 may include a first substrate 22a and a second substrate 22b coupled together using the first and second U-shaped tracks 26, 30. The one or more attachment members 34 may be operatively coupled to the first and second U-shaped tracks 26, 30 to provide clamping pressure to the first and second substrates 22a, 22b. The first and second U-shaped tracks 26, 30 may include the plurality of apertures 38 to receive the one or more attachment members 34 to help position the seat attachment member 134 in a variety of different positions as desired by the manufacturer or user. In some aspects, the use of the mounting rail assembly 10 enables the use of two or more substrates 22a, 22b rather than just one substrate 22. The use of two or more substrates 22a, 22b may help in reducing additional weight in the vehicle 18 and/or provide more efficient use of the lightweight core materials 126 that may be used as substrates 22. The saved material costs by using the mounting rail assembly 10 to couple the various substrates 22 are cumulative and may result in substantial savings for vehicle 18 manufacturers. In some aspects, the substrate 22 includes two or more substrates 22a, 22b that are coupled together using the clamping pressure provided using the one or more attachment members 34.

Referring now to FIG. 9B, a cross-sectional view of the mounting rail assembly 10 provided in FIG. 9A taken along the line IXB-IXB is illustrated. The mounting rail assembly 10 includes the first substrate 22a and the second substrate 22b positioned between the first and second U-shaped tracks 26, 30. The one or more attachment members 34 are configured to couple the first and second U-shaped tracks and provide a clamping pressure to the first and second substrates 22a, 22b. As previously provided in FIGS. 7 and 8, in some aspects, the first and second U-shaped tracks 26, 30 may each comprise the center portion 74 having flanges 78, 82 disposed outwardly from angled walls 86, 90. The first and second U-shaped tracks 26, 30 and the corresponding U-shaped substrate channel 94 these tracks may be positioned in are all complementary mirror images to each other so the first and second substrates 22a, 22b may be sandwiched together using the first and second U-shaped tracks 26, 30. In some aspects, a gap 146 may exist between the first and second U-shaped tracks 26, 30 where this gap 146 enclosed by the first and second U-shaped tracks 26, 30 can reduce the amount of material needed for the substrate 22.

In some aspects, an adhesive 138 and/or a metal weld 142 may be additionally applied to facilitate additional coupling strength to the first and second U-shaped tracks 26, 30 coupled to the one or more substrates 22. As illustrated in FIG. 9B, in some aspects, the first substrate 22a includes the adhesive 139 positioned between itself and the first and second U-shaped tracks 26, 30. The adhesive may be any adhesive material known by one skilled in the art including, for example, epoxides, glues, super glues, polyurethanes, and acrylates. In additional and overlapping aspects, the second substrate 22b includes the weld 142 positioned on or between itself and the first and second U-shaped tracks 26, 30. The weld may be applied using any welding method known in the art and may use any type of rod or metal material known by one skilled in the art including, for example, iron, steel, titanium, sodium alloys, and potassium alloys.

Figure 10:
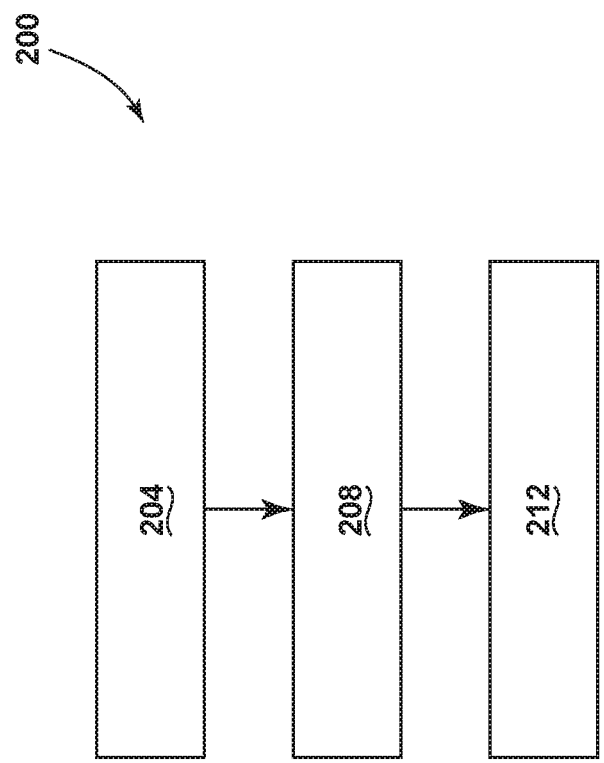
FIG. 10 is a flow diagram of a method for mounting a seat in a vehicle, according to some aspects of the present disclosure.

Referring now to FIG. 10, with continued reference to FIGS. 1-9B, a method 200 for mounting the seat 14 in the vehicle 18 is shown. The method 200 may begin with a step 204 that includes attaching one or more seats 14 to at least one mounting rail assembly 10. The mounting rail assembly 10 includes the first U-shaped track 26 and the second U-shaped track 30. The mounting rail assembly 10 additionally includes one or more substrates 22 positioned between the first and second U-shaped tracks 26, 30 and one or more attachment members 34 configured to couple the first and second U-shaped tracks 26, 30 by providing a clamping pressure to the one or more substrates 22. In addition, the mounting rail assembly 10 may include the seat attachment member 134 or a more general attachment member coupled to the first U-shaped track 126. In some aspects, the one or more seat attachment members 134 may be coupled to the first and/or second U-shaped tracks 26, 30.

Next is a step 208 of detaching the one or more seats 14. In some aspects, the detachment includes removing the one or more seats 14 from the seat attachment members 134. In some aspects, the coupling of the seat 14 to the seat attachment member 134 of the mounting rail assembly 10 may include snapping features, clicking features, fastening members, or other coupling means known in the art. In some aspects, the seat attachment members 134 may additionally be removed or detached from the mounting rail assembly 10.

Next is a step 212 of reattaching the one or more seats 14 to a different position on the at least one mounting assembly 10. In some aspects, the removed seat attachment members 134 may additionally be reattached to the mounting rail assembly 10. In some aspects, the reattachment step includes coupling the one or more seats 14 to the seat attachment members 134. In some aspects, the coupling of the seat 14 to the seat attachment member 134 of the mounting rail assembly 10 may include snapping features, clicking features, fastening members, or other coupling means known in the art. In some aspects, the seat attachment members 134 may extend the entire length of the first and/or second U-shaped tracks 26, 30. In other aspects, the seat attachment members 134 may extend for limited portions of the first and/or second U-shaped tracks 26, 30 and may be need to be repositioned to couple the seats 14.

It is understood that the descriptions outlining and teaching the mounting rail assemblies 10 previously discussed, which can be used in any combination, apply equally well to the method 200 for mounting the seat 14 to the vehicle 18.

It will be understood by one having ordinary skill in the art that construction of the described device and other components may not be limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is to be understood that variations and modifications can be made on the aforementioned structure without departing from the concepts of the present invention, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A mounting rail assembly for mounting a seat to a vehicle, comprising:
   a substrate positioned between a first U-shaped track and a second U-shaped track;
   one or more attachment members configured to couple the first and second U-shaped tracks providing a clamping pressure to the substrate;
   wherein the first and second U-shaped tracks comprise a first plurality of apertures to receive the one or more attachment members, and wherein the substrate includes at least one U-shaped substrate channel having a second plurality of apertures that align with the first plurality of apertures in the first and second U-shaped tracks.

2. The mounting rail assembly according to claim 1, wherein the first and second U-shaped tracks each comprise a center portion having flanges disposed outwardly from angled walls.

3. The mounting rail assembly according to claim 1, further comprising:
   one or more adjustable seat attachment members.

4. The mounting rail assembly according to claim 1, wherein the substrate is a floor panel.

5. The mounting rail assembly according to claim 1, wherein the substrate comprises a lightweight core material enclosed with an outer cover.

6. The mounting rail assembly according to claim 1, wherein the substrate is a honeycomb panel, a composite panel, a metal panel, a polymeric panel, or a combination thereof.

7. The mounting rail assembly according to claim 1, further comprising:
   an adhesive and/or a metal weld coupled to the substrate and the first and second U-shaped tracks.

8. The mounting rail assembly according to claim 1, wherein the substrate comprises two or more substrates that are coupled together using the clamping pressure provided using the one or more attachment members.

9. The mounting rail assembly according to claim 1, wherein the substrate is a floor panel and wherein the first and second U-shaped tracks are each positioned in a U-shaped substrate channel.

10. A mounting rail assembly, comprising:
    a first U-shaped track and a second U-shaped track comprising a center portion having flanges disposed outwardly from angled walls;
    one or more substrates positioned between the first and second U-shaped tracks; and
    one or more attachment members configured to couple the first and second U-shaped tracks by providing a clamping pressure to the one or more substrates, wherein the substrate comprises two or more substrates that are coupled together using the clamping pressure provided using the one or more attachment members.

11. The mounting rail assembly according to claim 10, wherein the mounting rail assembly is positioned on a vehicle floor, a truck bed, a vehicle sidewall, a truck bed sidewall, or a combination thereof.

12. The mounting rail assembly according to claim 10, further comprising:
    an adhesive and/or a metal weld coupled to the one or more substrates and the first and second U-shaped tracks.

13. The mounting rail assembly according to claim 10, wherein the substrate is a floor panel and wherein the first and second U-shaped tracks are each positioned in a U-shaped substrate channel.

14. A method for mounting a seat in a vehicle, the method comprising:
    attaching one or more seats to at least one mounting rail assembly, the mounting rail assembly comprising:

a first U-shaped track and a second U-shaped track;
one or more substrates positioned between the first and second U-shaped tracks; and
one or more attachment members configured to couple the first and second U-shaped tracks by providing a clamping pressure to the one or more substrates, wherein the substrate is a floor panel and wherein the first and second U-shaped tracks are each positioned in a U-shaped substrate channel.

15. The method according to claim 14, wherein the seat is attached to two mounting rail assemblies.

16. The method according to claim 14, further comprising:
detaching the one or more seats; and
reattaching the one or more seats to a different position on the at least one mounting rail assembly.

17. The method according to claim 14, wherein the substrate comprises two or more substrates that are coupled together using the clamping pressure provided using the one or more attachment members.

* * * * *